W. S. BROYLES.
Corn-Sheller.
No. 159,789. Patented Feb. 16, 1875.
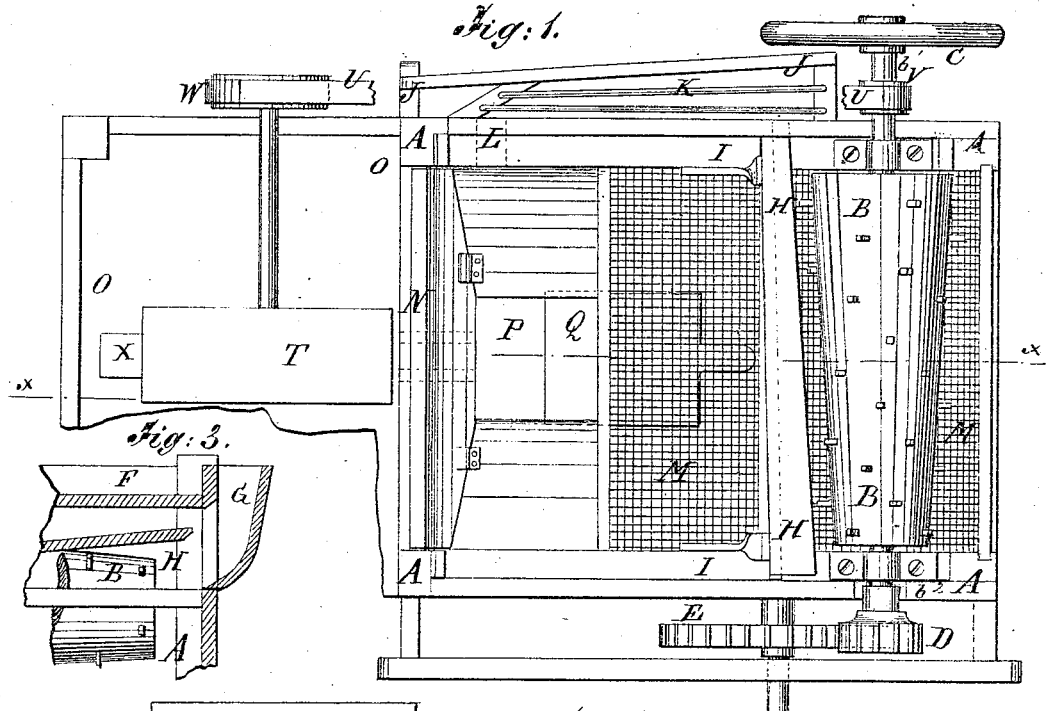
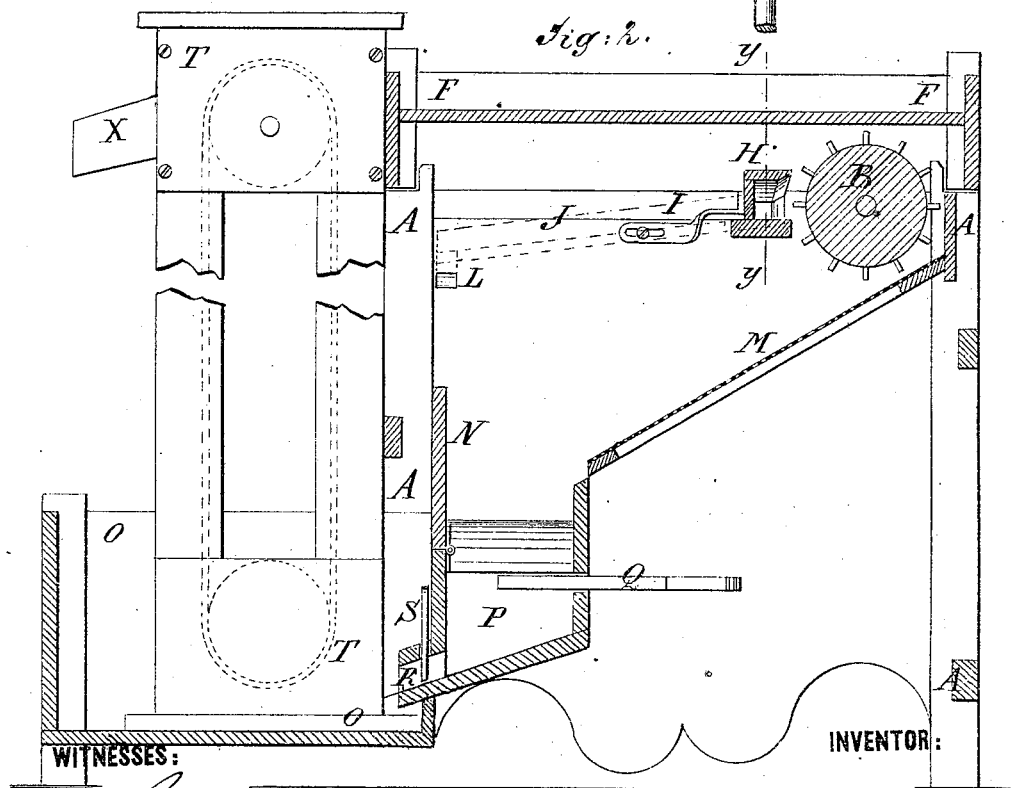

UNITED STATES PATENT OFFICE.

WILLIAM SMITH BROYLES, OF NOLA CHUCKY, TENNESSEE.

IMPROVEMENT IN CORN-SHELLERS.

Specification forming part of Letters Patent No. 159,789, dated February 16, 1875; application filed October 17, 1874.

*To all whom it may concern:*

Be it known that I, WILLIAM SMITH BROYLES, of Nola Chucky, in the county of Washington and State of Tennessee, have invented a new and useful Improvement in Corn-Sheller, of which the following is a specification:

Figure 1 is a top view of my improved machine, the cover or hopper being removed, and part being broken away. Fig. 2 is a vertical section of the same, taken through the line $x\ x$, Fig. 1. Fig. 3 is a detail section taken through the line $y\ y$, Fig. 2.

Similar letters of reference indicate corresponding parts.

My invention has for its object to furnish an improved corn-sheller which shall be so constructed as to shell the corn, separate it from the cobs, screen it, measure it, and sack it, and which shall be simple in construction, convenient in use, and easily operated.

The invention will first be fully described, and then pointed out in the claims.

A represents a box or frame. B is the shelling-cylinder, which is provided with teeth, and is made tapering in form, and the journals of which revolve in bearings in the upper rear part of the box or frame A. The journals of the shelling-cylinder B project, and to one, $b^1$, of them is attached a fly-wheel, C, to give steadiness of motion to the said cylinder B. The other journal, $b^2$, is squared off to receive a crank, and to it is attached a small gear-wheel, D, the teeth of which mesh into the teeth of a larger gear-wheel, E, the journals of which revolve in bearings attached to the box or frame A, and to a bar or bracket attached to said box or frame. The outer journal of the gear-wheel E is squared off to receive the crank. By this construction, by attaching the crank to the journal of the cylinder B, or of the gear-wheel E, a faster or slower motion may be given to the thrashing-cylinder, as may be desired. F is the cover of the box A, which is made flat, and with an upwardly-projecting flange around its edge, to adapt it to receive the ears of corn to be shelled. At one side of the cover F is formed a guide or feed-spout, G, of such a size as to allow an ear of corn to readily pass through it endwise, and which inclines inward, so as to guide the ears into the shield H, that crosses the box A from side to side at the side of the shelling-cylinder B, and the side of which next said cylinder is open, so as to allow the teeth of said cylinder to come in contact with the ears of corn, to remove the kernels and at the same time move the ears longitudinally through the shield H. The shield H is secured by means of slotted brackets or arms I, so that it may be moved closer to or farther from the shelling-cylinder, as the size of the ears may require. As the cobs reach the farther end of the shield H they pass out through a hole in the side of the box A, and enter the inclined spout J upon the outside of the box A, down which they slide to the floor or into a receiver placed to receive them. The inclined spout J is provided with a grate or rack, K, for the cobs to slide upon, so that any kernels that may pass out with the cobs may slide down the bottom of the said spout and fall into the lower forward part of the box A through a hole, L, in its side. The shelled corn falls upon the inclined screen M, placed beneath the thrashing-cylinder B, and through which the dust and dirt fall. The corn slides down the screen M and over the inclined apron N into the receiving-box O. The inclined apron or cut off N is hinged at its lower edge, so that it can be turned up into a vertical position when the corn is to be measured, to allow the corn to fall into the measuring-pit P, which is provided with a sliding top, Q, which, when the pit is full, may be pushed in to prevent the entrance of any more corn until its contents have been drawn out. From the lower part of the measuring-pit P a spout, R, provided with a closing-slide, S, leads into the receiving-box O, or into the lower part of the elevator T, which is secured detachably in the box O, and is driven from the shelling-cylinder B by the band U, which passes around a pulley, V, attached to the journal $b^1$ of said cylinder, and around the pulley W, attached to the journal of the upper shaft of the said elevator. From the upper part of the elevator T the corn flows through a spout, X, into the sacks, or into any desired receptacle.

Having thus described my invention, I claim as new, and desire to secure by Letters Patent—

1. The measuring-pit P, provided with spout R and slides Q S, the said pit receiving grain from cylinder, as shown and described.

2. The combination of hinged cut-off N with receiver O and pit P, as and for the purpose specified.

WILLIAM SMITH BROYLES.

Witnesses:
JOHN GRAY,
JAS. M. MARCK.